United States Patent [19]
Gunder

[11] Patent Number: 5,899,438
[45] Date of Patent: May 4, 1999

[54] GATE VALVE HAVING A SWINGABLE-SLIDABLE VALVE PLATE

[76] Inventor: James A. Gunder, 13693 McGuire, Taylor, Mich. 48180

[21] Appl. No.: 09/016,989

[22] Filed: Feb. 2, 1998

[51] Int. Cl.[6] .......................................................... F16K 3/02
[52] U.S. Cl. .......................... 251/229; 251/279; 251/302; 251/327
[58] Field of Search .................... 251/229, 279, 251/301, 302, 326, 327, 329

[56] References Cited

U.S. PATENT DOCUMENTS

| | | | |
|---|---|---|---|
| 2,701,117 | 2/1955 | Bashark | 251/174 |
| 3,237,916 | 3/1966 | Bryant | 251/301 |
| 3,249,117 | 5/1966 | Edwarde | 251/302 |
| 3,788,346 | 1/1974 | Fitzgerald | 251/302 |
| 4,875,504 | 10/1989 | Nicholson | 137/899 |
| 5,439,198 | 8/1995 | Reed | 251/231 |
| 5,445,190 | 8/1995 | Gunder | 137/899 |

FOREIGN PATENT DOCUMENTS

| | | | |
|---|---|---|---|
| 115540 | 12/1929 | Germany | 251/301 |
| 149906 | 6/1937 | Germany | 251/301 |
| 2404944 | 8/1974 | Germany | 251/302 |
| 213161 | 5/1941 | Switzerland | 251/301 |
| 1513278 | 10/1989 | U.S.S.R. | 251/301 |

*Primary Examiner*—George L. Walton
*Attorney, Agent, or Firm*—Charles W. Chandler

[57] ABSTRACT

A gate valve has a manual actuator that includes a crank having a direct pivotal connection with a slidable valve plate. The valve plate has a teardrop configuration that enables the valve plate to swing around the pivot connection as the plate slides along guide slot edge surfaces, between a closed position and an open position. Only a relatively small manual force is required to operate the valve.

1 Claim, 3 Drawing Sheets

GATE VALVE HAVING A SWINGABLE-SLIDABLE VALVE PLATE

BACKGROUND AND SUMMARY OF THE INVENTION

This invention relates to a gate valve, and particularly to a gate valve having an improved actuator linkage between a manual handle and a slidable valve plate.

Gate valves having manual actuators are already known. My U.S. Pat. No. 5,445,190 issued on Aug. 29, 1995 shows a gate valve having an external actuator having a pivotal link connecting a rotary plate to a valve plate. Manual rotation of the rotary plate causes the link pivot connection to move toward or away from the valve flow passage, whereby the valve plate is moved between its open and closed positions.

The present invention is directed to a gate valve having an actuator that is simplified from the actuator shown in my U.S. Pat. No. 5,445,190. The present actuator comprises a direct pivotal connection between a manual crank and a slidable valve plate, such that the valve plate has a combined slidable and swingable motion as it moves between its open and closed positions.

U.S. Pat. No. 2,701,117 issued to N. Bashark shows a manual actuator for a gate valve that includes a manually-operated crank arm having a pin-slot connection with a slidable valve plate. One disadvantage of the pin-slot connection is that for a considerable portion of the crank arm stroke the pin exerts an oblique force on the valve plate, such that the plate can have a tendency to bind or wedge against the edge guides in the valve housing. A relatively large manual force is required to move the valve plate from its closed position. Premature wear on the sliding surfaces may be a problem.

U.S. Pat. No. 4,875,504, issued to W. Nicholson, shows an electric motor actuator attachable to a manually-operated gate valve to remotely operate the valve.

U.S. Pat. No. 5,439,198, issued to L. Reed, shows a gate valve actuator that includes a manual lever extending angularly away from the plane of the slidable valve plate. One disadvantage of such a lever actuator is that the valve is bulky and space-inefficient. The valve can only be used where a relatively large installation space is available.

The present invention is concerned with a gate valve having an improved low cost manual actuator. The actuator is designed to achieve smooth slidable motion of a slidable valve plate with a relatively small manual effort.

In the preferred practice of the invention, the slidable valve plate has a direct pivotal connection with a manually-operated crank arm. Manual rotation of the crank arm through a swing arc of about one hundred eighty degrees causes the valve plate to slide and at the same time to swing around its pivotal connection with the crank arm. The valve plate has a rocking action on edge guide surfaces formed in the valve housing, so that the valve plate moves freely between its open and closed positions. A relatively small manual effort is effective to operate the valve.

Further features of the invention will be apparent from the attached drawings and description of a preferred embodiment of the invention.

BRIEF DESCRIPTION OF THE DRAWINGS

FIG. 6 shows the valve in a partially open condition. FIG. 7 shows the valve in a fully open condition.

DESCRIPTION OF A PREFERRED EMBODIMENT OF THE INVENTION

Figure 1:
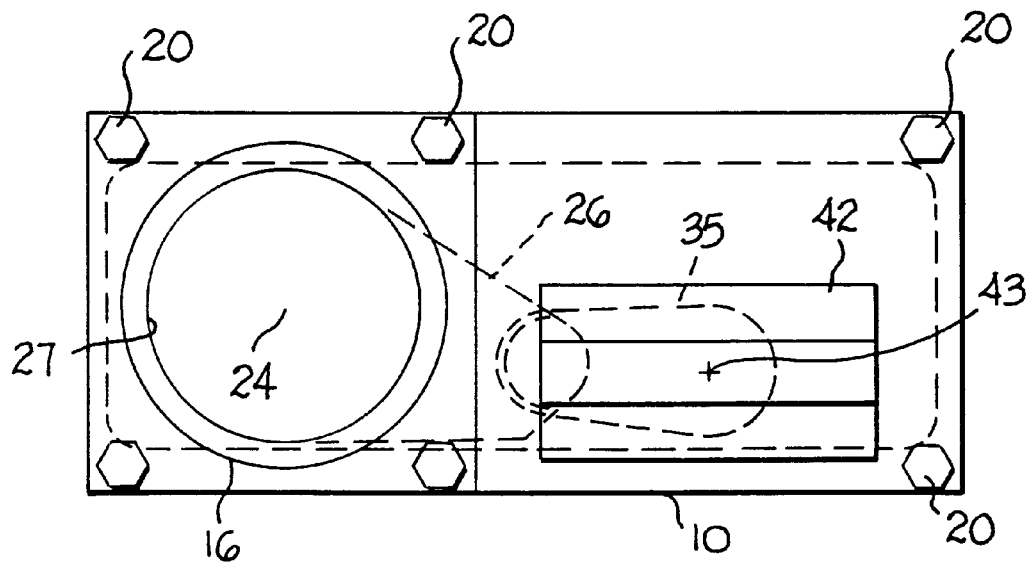
FIG. 1 is an end elevational view of a gate valve embodying the invention.
Figure 2:
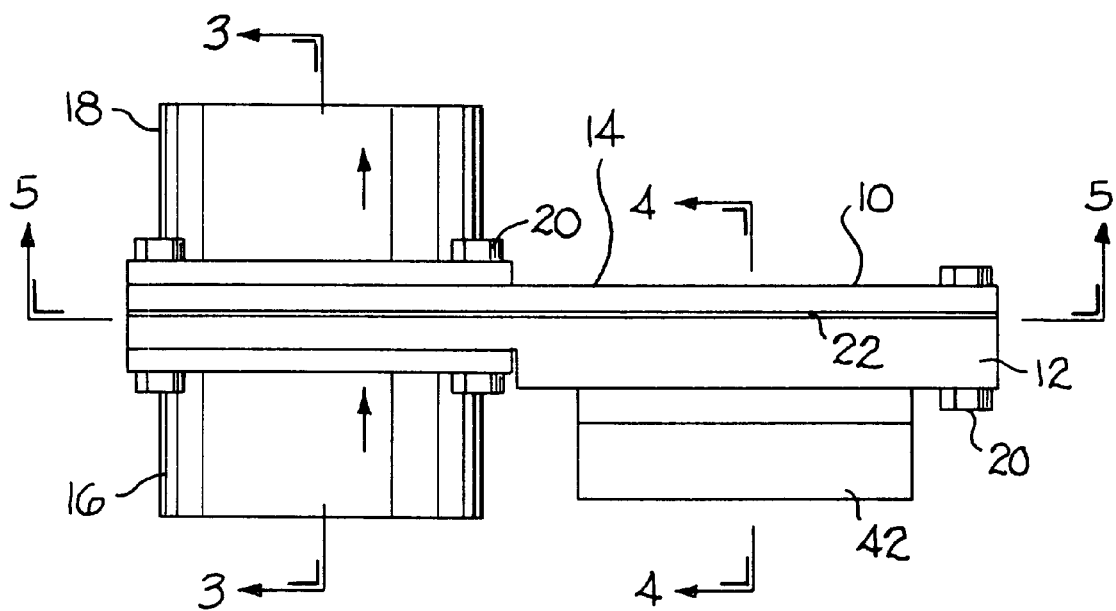
FIG. 2 is a top plan view of the gate valve shown in FIG. 1.

FIGS. 1 and 2 show a preferred gate valve construction embodying the invention. The valve is designed for use in a drainage line for waste liquids in a recreational vehicle, as is described more particularly in my aforementioned U.S. Pat. No. 5,445,190. The valve of the present invention comprises a valve housing 10 that includes two main housing sections 12 and 14 sandwiched between an inlet collar 16 and an outlet collar 18. The housing components are secured together by six nut-bolt assemblies 20 located at spaced locations along housing sections 12 and 14. Four of the nut-bolt assemblies extend through flanged areas of collars 16 and 18 to secure the collars to housing sections 12 and 14. A peripheral sealing gasket 22 is positioned between the mating flat surfaces of housing sections 12 and 14 to seal the housing against liquid leakage, especially when the slidable valve plate is in the open condition.

Figure 3:
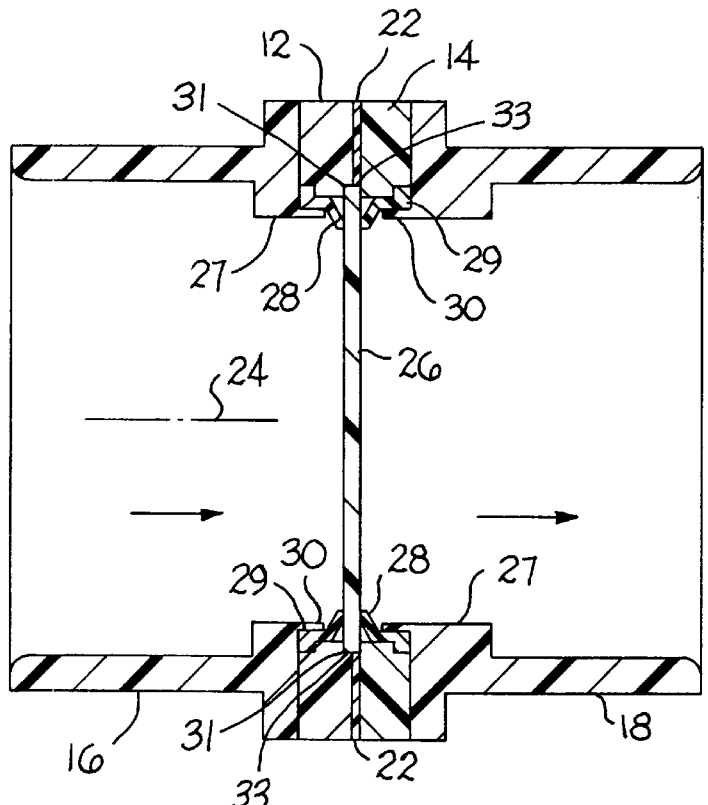
FIG. 3 is a sectional view taken on line 3—3 in FIG. 2.
Figure 4:
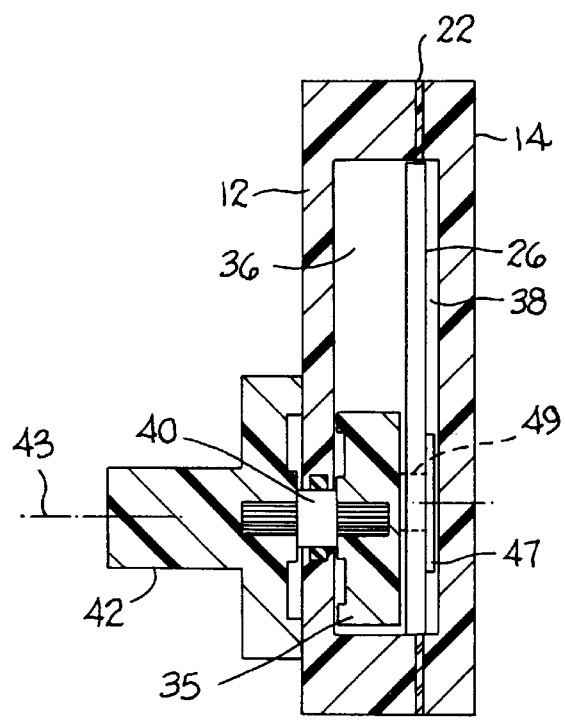
FIG. 4 is a sectional view taken on line 4—4 in FIG. 2.
Figure 5:
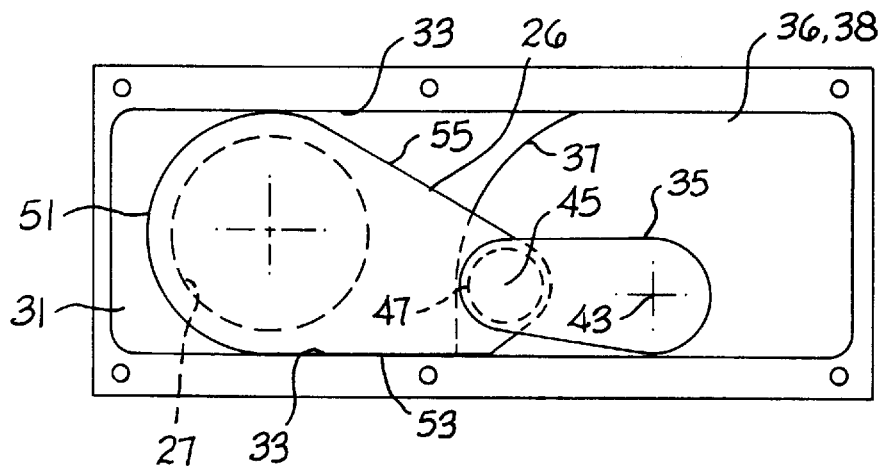
FIG. 5 is a sectional view taken essentially on line 5—5 in FIG. 2.
Figure 6:
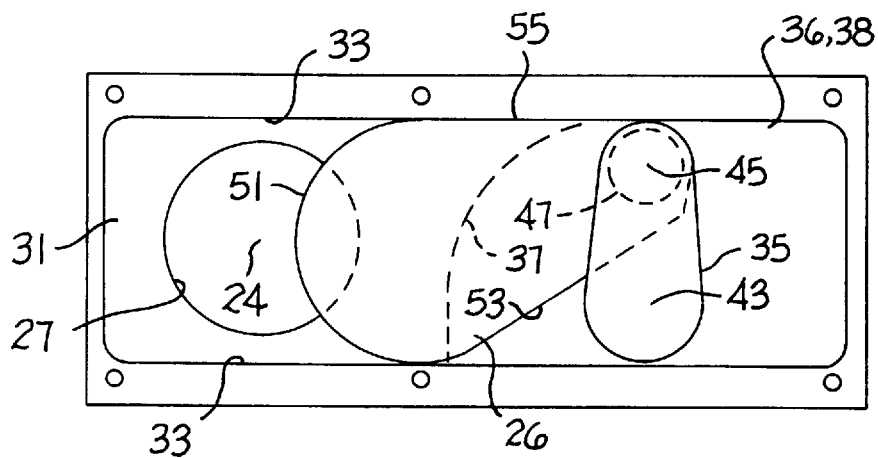
FIGS. 6 and 7 are views taken in the same direction as FIG. 5, but showing the valve plate in different positions of adjustment.
Figure 7:
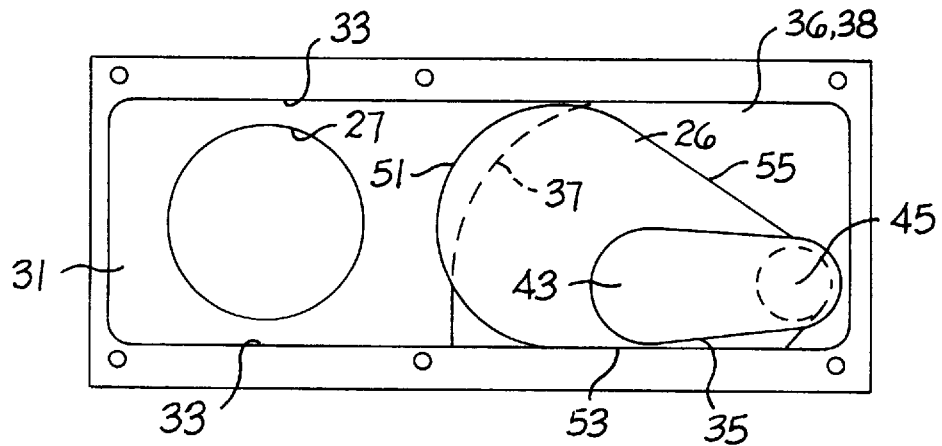

Each collar 16 or 18 has a cylindrical configuration that forms a circular flow port centered on a central flow axis 24. The two collars are aligned on axis 24, such that when an associated valve plate 26 is moved to an offset position out of alignment with the collar openings, liquid can flow through the valve, as indicated by the arrows in FIGS. 2 and 3. FIGS. 3 and 5 show valve plate 26 in the closed position blocking fluid flow through the valve. FIG. 7 shows valve plate 26 in the fully open position permitting full flow through the valve. FIG. 6 shows valve plate 26 in a partially open intermediate position.

FIG. 6 represents a transitional stage during movement of a valve plate 26 between its closed and open positions. The valve is intended to be either open (FIG. 7) or closed (FIG. 5). FIG. 6 merely illustrates one position of the actuator componentry during movement of the valve plate between its closed and open positions. In the drawing numeral 27 represents the aligned circular flow ports defined by collars 16 and 18 (and associated sealing rings).

In the FIG. 3 closed position the flat major surfaces of valve plate 26 are contacted by lips 28 on elastomeric annular seal rings 29. Each collar 16 or 18 has an axial flange 30 that extends radially inward from the mounting area of an associated seal ring 29, whereby the seal rings are securely retained between the collars and annular recesses in the outer surfaces of housing sections 12 and 14.

As shown in FIGS. 1 through 4, housing sections 12 and 14 are rectangular in plan configuration. The facing surfaces of the two housing sections are recessed to form a guidance slot 31 for valve plate 26. As best shown in FIGS. 5 through 7, guidance slot 31 has two parallel edge surfaces 33 extending transverse to the flow axis 24, whereby valve plate 26 moves in the transverse plane between its open and closed positions.

In the areas that define flow ports 27, the width of guide slot 31 is marginally greater than the thickness of valve plate 26 (typically about two millimeters). In the areas to the right of the flow ports 27 the housing sections 12 and 14 are formed with enlarged cavities 36 and 38 for accommodating a crank 35.

In FIGS. 5 through 7, numeral 37 represents the leftmost limit of cavities 36 and 38. During the entire motion of valve plate 26 between its open and closed positions, at least a portion of plate 26 is located within the narrow guide slot 31 formed to the left of cavities 36 and 38.

Crank 35 is suitably attached to a pivot shaft 40 that extends through housing section 12. A manually-turnable handle 42 is suitably affixed to the outer end of shaft 40, whereby manual rotation of handle 42 around shaft axis 43 produces a swing motion of the associated crank 35. An approximately one hundred eighty degree turning of the crank around swing axis 43 moves valve plate 26 between its closed and open positions.

Valve plate 26 has a pivot connection 45 with the free end of crank 35. The pivot connection can take various forms, e.g. a stub shaft 49 extending from a circular disk 47 through a circular hole in valve plate 26 into a mounting hole in crank 35. Disk 47 retains valve plate 26 in a desired plane alongside crank 35, such that plate 26 cannot migrate off the stub shaft. Plate 26 can rotate around the axis of stub shaft 49.

Valve plate 26 has a peripheral edge that includes a semi-circular edge section 51 and two straight edge sections 53 and 55. At least a portion of semi-circular edge section 51 has a knife configuration to facilitate entry into the space between seal rings 29. Edge sections 53 and 55 are convergent, such that the valve plate has a teardrop configuration in plan view. The diameter of semi-circular edge section 51 is substantially the same as the spacing between the two slot edge surfaces 33, whereby edge section 51 can slide, and at the same time, rock on edge surfaces 33 as valve plate 26 moves between the FIG. 5 closed position and the FIG. 7 open position. Edge surfaces 33 guide valve plate 26 without restricting the swinging motion that is produced by the pivot connection 45 with crank 35.

In the closed position (FIG. 5) the semi-circular edge section 51 of valve plate 26 is concentric with the circular flow ports 27. Also, straight edge section 53 on the valve plate abuts one of the slot edge surfaces 33 to limit movement of the valve plate to the desired position. As crank 35 is rotated clockwise through the FIG. 6 condition, the semi-circular edge section 51 on the valve plate rocks on the slot edge surfaces 33 while the pivot connection 45 pulls the valve plate rightwardly toward the FIG. 7 open condition. When the FIG. 7 condition is reached, the straight edge section 53 on the valve plate abuts an associated slot edge surface 33 to limit (prevent) further movement of the valve plate. The valve plate can be returned to the FIG. 5 closed position by reversing the motion of handle 42 and crank 35.

The illustrated actuator arrangement is characterized by a desired simplification, wherein valve plate 26 is directly connected to crank 35, without any intervening mechanisms. The pivotal connection 45 lets the valve plate swing freely while the plate is moving along edge surfaces 33. There is minimal tendency for plate 26 to bind or stick. Only a relatively low manual effort is required to operate the valve between its open and closed positions.

Having described my invention, I claim:

1. A gate valve comprising:

a valve housing that includes two housing sections (12, 14) having outer peripheral flat surfaces sealably joined together, and inner facing flat surfaces spaced apart to form a guide slot (31); each housing section having a circular hole in the associated inner flat surface, and an annular elastomeric sealing ring (29) seated on each housing section within the respective circular hole to form a flow opening;

said housing sections being internally recessed to form a crank cavity (36, 38) communicating with said guide slot; said guide slot having two parallel linear edges (33) continuing beyond the slot to form boundary edge surfaces for the crank cavity; said crank cavity having facing major surfaces spaced apart by said boundary edge surfaces;

a slidable valve plate (26) disposed in said guide slot for slidable movement between a closed position blocking flow through said flow opening, and an open position permitting flow through said flow opening;

a manual crank (35) located within said crank cavity for swinging motion around a swing axis that extends parallel to the axis of the flow opening;

a pivotal connection (45) between said crank and said slidable valve plate, whereby said plate swings around said pivotal connection as it slides within the guide slot between its open and closed positions;

said slidable valve plate having a semi-circular edge section (51) that has a diameter equal to the spacing between the linear edges of said guide slot, said simicircular edge section having a pair of camming surfaces, whereby said valve plate camming surfaces engage at least a portion of said linear edges, in all positions of said valve plate;

said crank having a swing arc around said swing axis of one hundred eighty degrees during movement of the slidable valve plate between its open and closed positions;

said swing axis being located relatively close to one of said boundary edge surfaces and relatively remote from the other boundary edge surface; said crank having a free end that passes closely alongside said other boundary edge surface during arcuate movement of the crank around the swing axis;

said valve plate and said crank having overlapping areas; said pivotal connection comprising a pivot pin extending transversely through the overlapping areas of said valve plate and crank, and an enlarged disk (47) connected to said pin; said disk having a flat face in close proximity to one of the facing major surfaces of the crank cavity;

the flat facing surfaces of said guide slot having a constant spacing over the entire extent of the guide slot, whereby said guide slot maintains the valve plate in a single plane during movement between the open and closed positions; and the semi-circular edge section on said valve plate having a knife edge sharpness, whereby said valve plate is enabled to readily pass into the space between said sealing rings as the valve plate moves to the closed position.

* * * * *